US008152160B2

(12) United States Patent
Ouellette et al.

(10) Patent No.: US 8,152,160 B2
(45) Date of Patent: Apr. 10, 2012

(54) TIER SHEET DISPENSING APPARATUS FOR A CONVEYOR SYSTEM

(75) Inventors: Joseph F. Ouellette, Glendale, MO (US); Richard J. Ouellette, Glendale, MO (US)

(73) Assignee: Ouellette Machinery Systems, Inc., Fenton, MO (US)

( * ) Notice: Subject to any disclaimer, the term of this patent is extended or adjusted under 35 U.S.C. 154(b) by 514 days.

(21) Appl. No.: 11/946,663

(22) Filed: Nov. 28, 2007

(65) Prior Publication Data

US 2008/0122160 A1    May 29, 2008

Related U.S. Application Data

(60) Provisional application No. 60/867,529, filed on Nov. 28, 2006.

(51) Int. Cl.
*B65H 1/00* (2006.01)

(52) U.S. Cl. ............ 271/161; 271/11; 414/797; 414/793

(58) Field of Classification Search .................. 271/161, 271/11; 414/789.5, 793, 796.6, 797, 799, 414/927
See application file for complete search history.

(56) References Cited

U.S. PATENT DOCUMENTS

| | | | | | |
|---|---|---|---|---|---|
| 3,912,253 | A | * | 10/1975 | Jarman | 271/5 |
| 4,228,993 | A | * | 10/1980 | Cathers | 271/236 |
| 4,971,515 | A | * | 11/1990 | Pol et al. | 414/797 |
| 5,049,030 | A | * | 9/1991 | Lockert | 414/788.7 |
| 5,433,426 | A | * | 7/1995 | Bond | 271/92 |
| 5,556,505 | A | * | 9/1996 | Hill | 156/570 |
| 6,086,063 | A | * | 7/2000 | Esenther | 271/194 |
| 6,209,293 | B1 | * | 4/2001 | Powers | 53/475 |
| 6,318,955 | B1 | * | 11/2001 | Ouellette | 414/796.2 |
| 7,328,895 | B2 | * | 2/2008 | Dinatale et al. | 271/11 |
| 2003/0012636 | A1 | * | 1/2003 | Fujino et al. | 414/795.8 |
| 2005/0212196 | A1 | * | 9/2005 | Dobbertin et al. | 271/145 |

* cited by examiner

*Primary Examiner* — Stefanos Karmis

*Assistant Examiner* — Ernesto Suarez (74) *Attorney, Agent, or Firm* — Joseph M. Rolnicki; Evans & Dixon, LLC (57) ABSTRACT

A tier sheet dispensing apparatus for a conveyor system stores a stack of tier sheets and sequentially dispenses the tier sheets, one at a time, onto the top of a two-dimensionally arrayed layer of objects that is being conveyed on a conveyor system. The tier sheet dispensing apparatus has a curved surface that supports the stack of tier sheets. The curved surface bends the stack of tier sheets in a convex curve that facilitates the removal of a single sheet from the top of the stack. The apparatus also has a lift mechanism that moves vertically over the stack of tier sheets to selectively attach to the top tier sheet in the stack and raise the top tier sheet from the stack. The lift mechanism also moves transversely relative to the stack of tier sheets to position the attached tier sheet over the conveyor for placement of the tier sheet on the layer of objects conveyed by the conveyor.

24 Claims, 7 Drawing Sheets

TIER SHEET DISPENSING APPARATUS FOR A CONVEYOR SYSTEM

This patent application claims the benefit of provisional patent application No. 60/867,529 filed on Nov. 28, 2006.

BACKGROUND OF THE INVENTION (1) Field of the Invention

The present invention is a tier sheet dispensing apparatus for a conveyor system. In particular, the present invention is directed to a tier sheet dispensing apparatus that stores a stack of tier sheets and sequentially dispenses the tier sheets, one at a time, onto the top of a two-dimensionally arrayed layer of objects that is being conveyed on a conveyor system.

The tier sheet dispensing apparatus has a curved surface that supports the stack of tier sheets. The curved surface bends the stack of tier sheets in a convex curve that facilitates the removal of a single sheet from the top of the stack.

The apparatus also has a lift mechanism that moves vertically over the stack of tier sheets to selectively attach to the top tier sheet in the stack and raise the top tier sheet from the stack. The lift mechanism also moves transversely relative to the stack of tier sheets to position the attached tier sheet over the conveyor for placement of the tier sheet on the layer of objects conveyed by the conveyor.

(2) Description of the Related Art

In shipping objects such as cans or plastic bottles, it is cost efficient to stack and secure two-dimensionally arrayed layers of the objects on a pallet. This enables a large number of the objects to be easily transported from one location to another by moving the pallet. The objects are arranged in layers stacked on the pallet, with each layer of objects being separated by a tier sheet. The tier sheets help maintain the positions of the objects in each layer. The layers of objects and the tier sheets positioned between the layers are secured on the pallet by banding, being wrapped by shrink wrap, or other equivalent means.

Conveyor systems are used to transport two-dimensionally arrayed layers of objects to a palletizer where each layer of objects is sequentially stacked on a pallet. A tier sheet dispenser is typically positioned along the conveyor system or at the palletizer to position a tier sheet on top of each layer of objects conveyed past the dispenser.

The typical tier sheet is constructed as a flat, thin rectangular sheet of a material such as fiber board. Just as a pallet is often reused many times in transporting goods, tier sheets are also often used many times in their useful lives. During the life of a typical tier sheet, the edges and the corners of the sheet will become damaged by repeated contacts with other objects, and by the forces exerted by banding or packaging wrap on the edges and the corners of the tier sheet. Due to this damage, only the central portion of the tier sheet remains substantially flat. The damaged edges and the corners will present generally angled surfaces relative to the relatively flat surface of the tier sheet central portion. This presents problems when a plurality of objects are stacked in a two-dimensional array on the tier sheet. The generally flat central portion of the used tier sheet will support the array of objects in their relative positions to each other. However, the damaged edges and corners of the tier sheet often have surfaces that cannot maintain the relative positions of the plurality of objects around the perimeter of the two-dimensionally arrayed stack of objects. This can result in objects falling off of the damaged edges and corners of the tier sheet.

In conveyor systems that are used in conveying two-dimensionally arrayed layers of objects to a palletizer, the quicker the conveyor system can move the layers of objects to the palletizer to load the layer of objects on a pallet, the more cost efficiently the conveyor system and palletizer can be operated. One of the more time consuming steps in conveying a layer of objects to a pallet to be palletized is in the positioning of a tier sheet on the layer of objects and in the stacking of the layer of objects on another layer of objects and a tier sheet that have been previously stacked on a pallet. This is particularly true if objects from the arrayed layer of objects positioned on a tier sheet fall from the perimeter of the arrayed layer of objects due to the damaged edges and corners of the tier sheet. If the time involved in positioning a tier sheet on a layer of objects can be reduced, and if the objects of a subsequent layer of objects positioned on the tier sheet could be prevented from falling from the edges and corners of a used tier sheet, then the time involved in loading a pallet can be appreciably reduced. This can result in a significant reduction in the costs involved in palletizing objects for transportation.

SUMMARY OF THE INVENTION

The present invention is a tier sheet dispensing apparatus that has a novel design that enables the apparatus to dispense tier sheets in a more time efficient manner than that of prior art tier sheet dispensers. In addition, the apparatus supports a stack of tier sheets prior to their being dispensed in a manner that results in the edges and corners of a used tier sheet bowing upwardly slightly when the used tier sheet is positioned on a previously positioned two-dimensional arranged layer of objects. This results in the objects around the perimeter of a subsequent layer of objects positioned on the tier sheet being held against falling from the tier sheet.

The novel features of the tier sheet dispensing apparatus include a hoist that has a surface for supporting a stack of tier sheets in a convexly curved configuration. The convexly curved configuration of the top tier sheet in the stack enables the tier sheet to be removed quickly from the stack. The curved configuration of the top tier sheet in the stack also results in the perimeter edges and corners of the tier sheet angling upward slightly when the tier sheet is positioned on a previously positioned two-dimensional arranged layer of objects.

The novel features also include a lift mechanism that employs vacuum pressure to quickly attach to the top tier sheet of the stack and lift the tier sheet from the stack. The lift mechanism also moves the attached tier sheet transversely to the stack to a two-dimensionally arrayed layer of objects being conveyed by an adjacent conveyor system.

The tier sheet dispensing apparatus of the invention is designed to be positioned adjacent the conveying surface of a conveyor that conveys two-dimensionally arrayed layers of objects to a palletizer to be stacked on a pallet. The apparatus includes a support surface that supports a stack of tier sheets positioned in the apparatus. The support surface faces upwardly in the apparatus and has a convexly curved configuration. The stack of tier sheets positioned on the support surface is bent or formed in a curve. The top tier sheet in the stack has a top surface that is bent in a convex configuration by the support surface.

A hoist mechanism is operatively connected to the support surface. The hoist mechanism is operable to selectively move the support surface vertically upwardly and downwardly. A control system controls the vertical movement of the hoist mechanism. Sensors communicate with the control system and monitor the position of the top tier sheet in the stack relative to the apparatus. As the top tier sheet on the stack is removed, the absence of the tier sheet is sensed by the sensor which sends a signal to the control system. The control system controls the operation of the hoist mechanism to incrementally move the support surface upwardly until the next succeeding tier sheet in the stack is sensed by the sensor. The sensor then provides another signal to the control system that in turn controls the hoist mechanism to stop the incremental upward movement of the support surface.

The apparatus includes a lift mechanism positioned above the support surface and above the stack of tier sheets supported on the support surface. The lift mechanism includes a motive source that moves the lift mechanism vertically downward and upward relative to the stack of tier sheets supported in the apparatus, and moves the lift mechanism transversely from a position over the stack of tier sheets to a position over the conveying surface of the conveyor adjacent the apparatus.

The lift mechanism is provided with a plurality of arms that project outwardly from the lift mechanism to a distal end of each arm. The arms are mounted to the lift mechanism for movement of the arm distal ends downwardly and upwardly relative to the lift mechanism. A lift surface is provided at the distal end of each arm. Additional lift surfaces are provided at a central area of the lift mechanism that is surrounded by the arms.

Vacuum openings are provided in each of the lift surfaces. The vacuum openings communicate with a source of vacuum pressure that is controlled to selectively supply vacuum pressure to the lift surfaces.

The lift surfaces are positioned on the lift mechanism so that, when the lift mechanism is moved downwardly toward the stack of tier sheets supported on the hoist mechanism, each of the lift surfaces engages against the top surface of the top tier sheet in the stack. The vacuum pressure supplied to the vacuum opening of each lift surfaces holds the top tier sheet of the stack to the lift mechanism. When the lift mechanism is moved vertically upwardly relative to the stack of tier sheets, the top tier sheet is removed from the stack by the lift mechanism. Position sensors on the lift mechanism adjacent the four corners of the tier sheet sense whether all four corners of the tier sheet are securely held by the lift mechanism. If one of these position sensor senses that a corner of the tier sheet is not held by the lift mechanism, then the vacuum pressure supplied to each of the lift surfaces is stopped, and a plunger on the lift mechanism is deployed to quickly push the tier sheet back down toward the stack to properly position the lift sheet on the stack for a subsequent attempt to lift the tier sheet. The lift mechanism will not lift a tier sheet unless the four position sensors all sense the presence of a corner of the tier sheet. When a tier sheet is properly lifted from the stack, subsequent tranverse movement of the lift mechanism relative to the stack of tier sheets positions the top tier sheet held by the lift mechanism over a two-dimensionally arrayed layer of objects conveyed by the adjacent conveying surface. Stopping the vacuum pressure supplied to each of the vacuum openings of the lift surfaces causes the lift mechanism to drop the tier sheet onto the top of the two-dimensionally arrayed layer of objects on the conveying surface. The conveying surface then conveys the layer of objects and the tier sheet to a palletizer to be stacked on a pallet. Simultaneously, the lift mechanism moves transversely back to its original position over the hoist mechanism to remove the next tier sheet from the top of the stack of tier sheets supported in the hoist mechanism.

As the lift mechanism moves downwardly to engage the next tier sheet on top of the stack, the hoist mechanism is controlled to move the stack of tier sheets incrementally upwardly to reduce the distance of travel between the lift mechanism and the top tier sheet of the stack. The hoist mechanism moving the stack of tier sheets upwardly simultaneously with the lift mechanism moving downwardly to receive the next tier sheet reduces the time involved in dispensing tier sheets from the apparatus. The bending of the stack of tier sheets making it easier to remove the top tier sheet from the stack also improves the time efficiency of the dispenser operation. Additionally, the use of vacuum pressure at the vacuum openings of the lift surfaces enables the lift mechanism to hold and lift a tier sheet from the stack in a more time efficient manner than if conventional graspers or other types of gripping mechanisms were employed to grasp the top tier sheet and remove the tier sheet from the stack.

The novel design of the hoist mechanism and lift mechanism of the apparatus enable the apparatus to more quickly dispense tier sheets to a two-dimensionally arrayed layer of objects being conveyed on an adjacent conveying surface than has been possible in the prior art. In this manner, the apparatus of the invention operates in a more time efficient manner than prior art tier sheet dispensing apparatus.

BRIEF DESCRIPTIONS OF THE DRAWING FIGURES

Further features of the invention are set forth in the following detailed description of the preferred embodiment of the invention and in the following drawing figures.

DETAILED DESCRIPTION OF THE PREFERRED EMBODIMENT OF THE INVENTION

Figure 1:
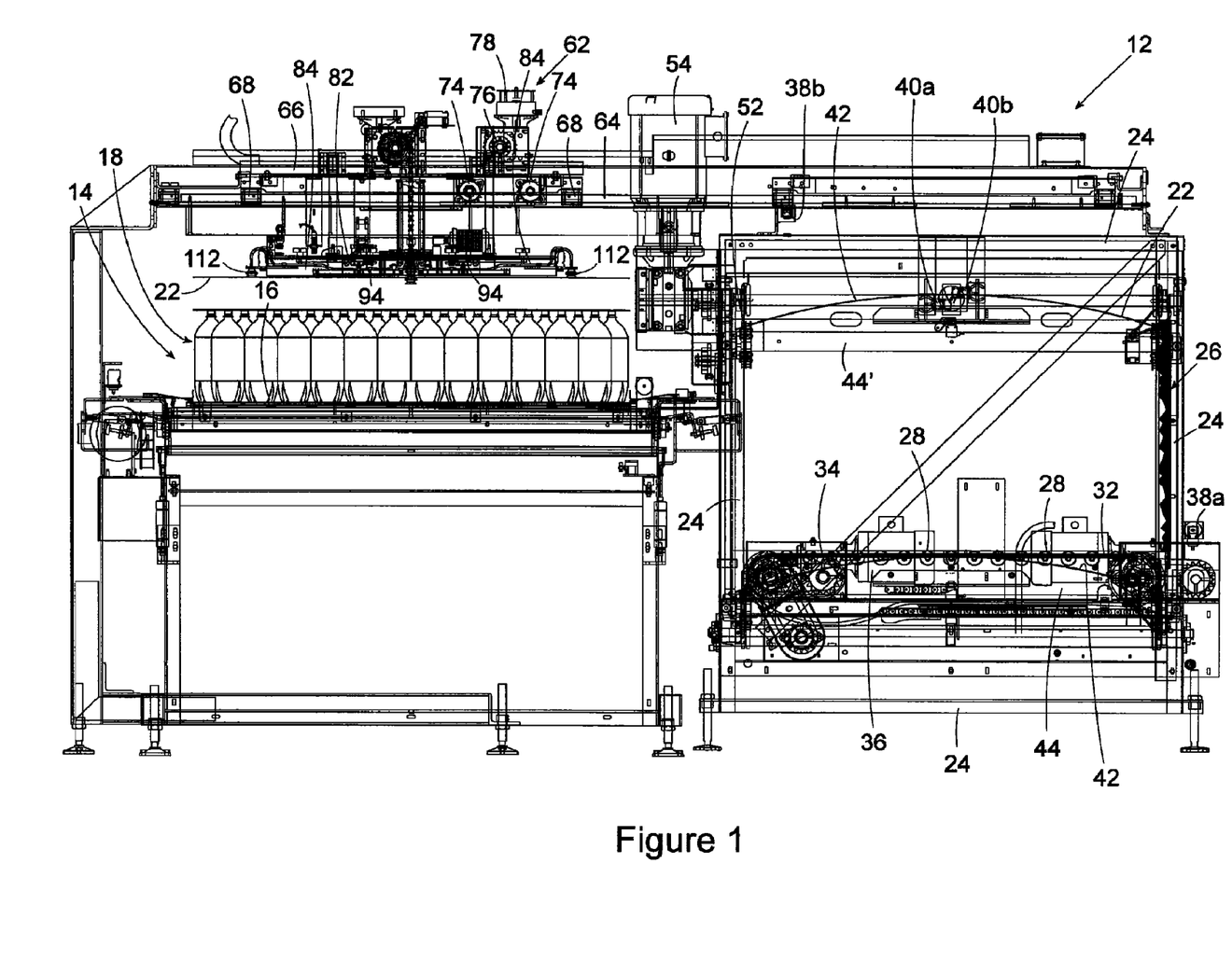
FIG. 1 is a side elevation view of the tier sheet dispensing apparatus of the invention positioned adjacent to and extending over a conveyor system.

FIG. 1 shows the tier sheet dispensing apparatus 12 of the invention positioned adjacent a conveyor system 14. The conveyor system 14 shown is only one example of a conveyor system with which the tier sheet dispensing apparatus 12 may be used. The conveyor system 14 is shown from an upstream end of the system. The conveyor system includes a conveying surface 16 that moves in a downstream direction into the plane of FIG. 1. The conveying surface 16 supports a plurality of objects 18 that are arranged in a two-dimensionally arrayed layer on the conveying surface 16. The objects 18 that are shown in FIG. 1 are a plurality of plastic bottles. A tier sheet 22 is shown positioned on the tops of the two-dimensionally arrayed layer of objects 16. As is conventional, the tier sheet 22 is typically a rectangular piece of fiber board or other similar material. This tier sheet 22 has been positioned on the objects 18 by a lift mechanism of the invention. The lift mechanism is shown above the object 12 in FIG. 1. The mechanism is shown holding the tier sheet 22' prior to it being positioned on the layer of objects 18. As will be explained, the tier sheet dispensing apparatus 12 of the invention is employed in dispensing individual tier sheets from a stack of tier sheets to a position over each two-dimensionally arrayed layer of objects 18 conveyed on the conveying surface 16 and placing the tier sheet 22 on the layer of objects 18 as shown in FIG. 1.

Figure 4:
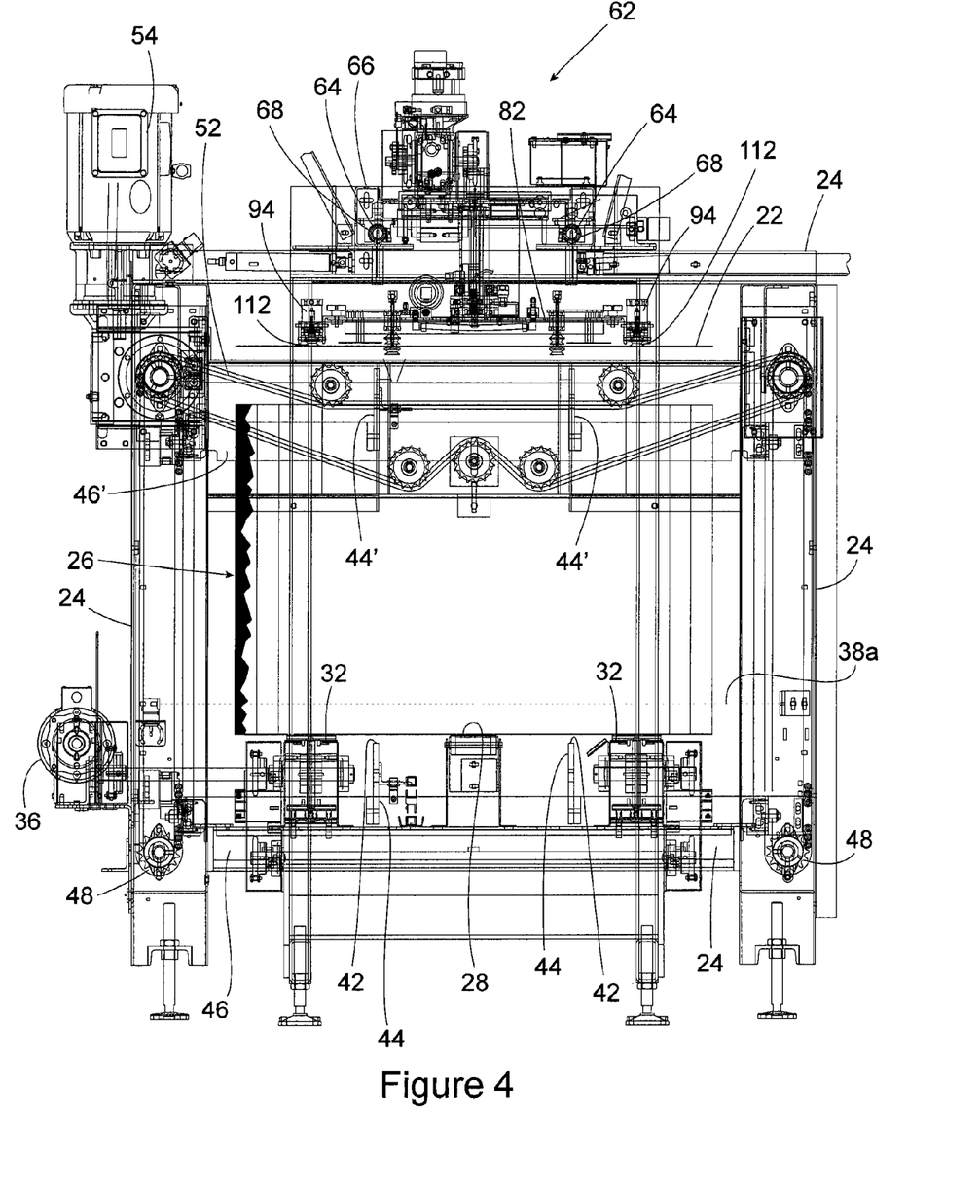
FIG. 4 is an end elevation view of the tier sheet dispensing apparatus from the right side of the apparatus shown in FIG. 3.

The tier sheet dispensing apparatus 12 is comprised of a frame 24 that supports the component parts of the apparatus. The frame 24 is constructed of a plurality of metal bars 24 that are assembled together in a box configuration. The frame 24 is dimensioned to receive a stack of tier sheets 26 in the interior of the frame. FIG. 4 shows a front of the frame 24 that is open to receive the stack of tier sheets 26 in the frame interior. The top of the frame 24 is also open to allow for passage of single tier sheets from the frame. Thus, the component parts of the tier sheet dispensing apparatus 12 are arranged at the bottom of the frame 24 and at the sides of the frame where they do not obstruct the placement of the stack of tier sheets 26 in the frame interior, or the dispensing of individual tier sheets 22 from the top of the frame.

In the preferred embodiment of the invention, a tier sheet conveying system (not shown) is positioned adjacent to the tier sheet dispensing apparatus 12 to supply a stack of tier sheets 26 to the front of the apparatus frame 24 shown in FIG. 4. The tier sheet conveying system is operable to deliver a stack of tier sheets into the frame interior. Any type of known conveying system could be used for this purpose.

A plurality of parallel rollers 28 are arranged in a line at the bottom of the apparatus frame 24. The rollers 28 are positioned at the center of the bottom of the frame 24 to support the stack of tier sheets 26 as the stack is loaded into the apparatus frame. The rollers 28 allow the stack of tier sheets 26 to move across the plurality of rollers 28 into the interior of the frame 24.

A pair of narrow belt conveyors 32 are positioned at the bottom of the frame 24 on opposite sides of the plurality of rollers 28. As best seen in FIG. 4, the pair of belt conveyors 32 have top conveying surfaces 34 that are positioned in the same plane as the tops of the plurality of rollers 28. The belt conveyors 32 are powered by a motor 36 to move the stack of tier sheets 26 supported on the belt conveying surfaces 34 into the interior of the frame 24. The top conveying surfaces 34 of the two belt conveyors 32 receive the stack of tier sheets 26 from the tier sheet conveying system (not shown) and move the stack of tier sheets 26 across the rollers 28 and into the interior of the frame 24 to the position of the stack of tier sheets 26 shown in FIGS. 1, 3, and 4. The positioning of the stack of tier sheets is controlled by a series of optical sensors that emit light beams represented by the dashed lines shown in FIGS. 2, 3, and 4. A first of the light beams 38a is broken as a stack of tier sheets is inserted into the frame 24. When the stack of tier sheets is fully inserted into the frame, a second 38b of the light beams is broken and the first light beam 38a is unobstructed, indicating that the stack of tier sheets 26 has been fully inserted into the frame 24. With the stack of tier sheets 26 supported on the conveying surfaces 34 of the belt conveyors 32 in the interior of the frame 24, each of the tier sheets in the stack 26 is substantially flat.

Figure 3:
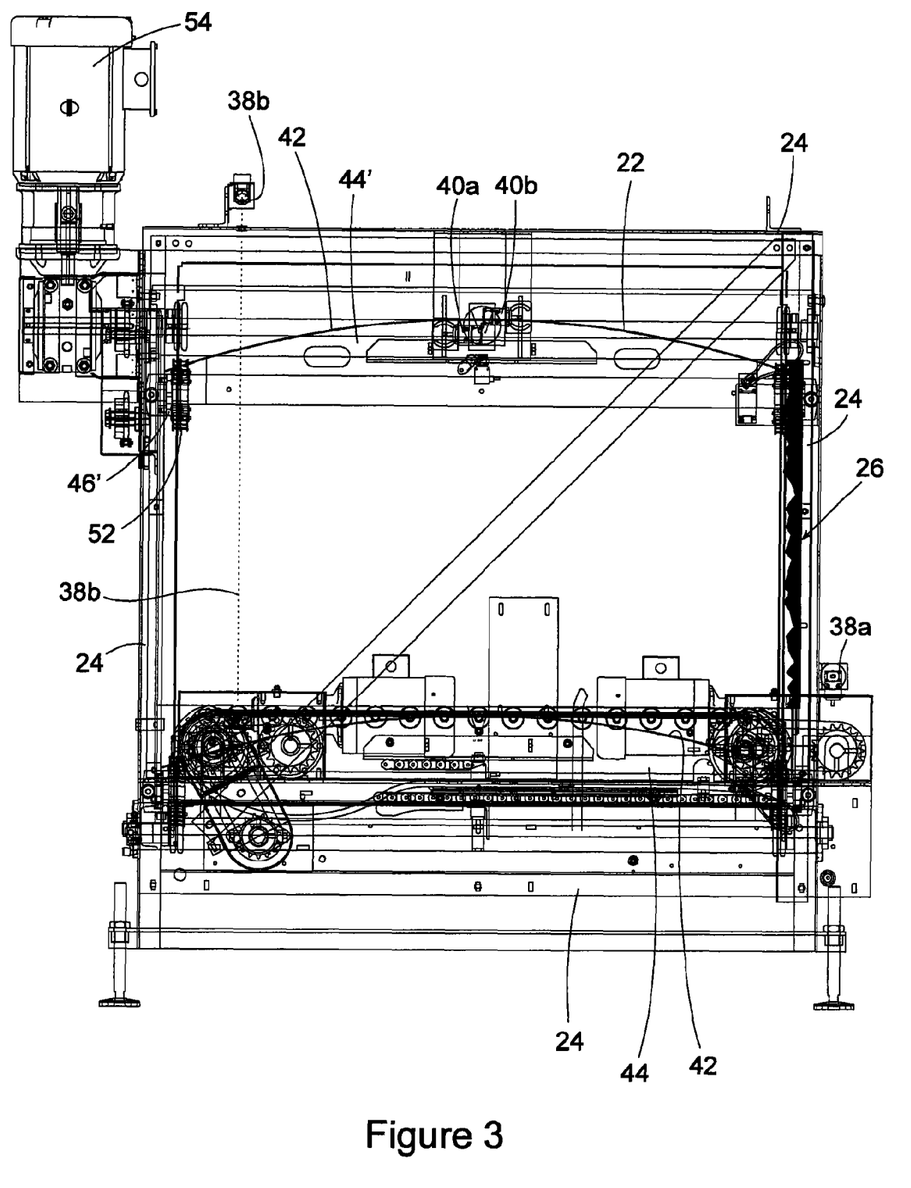
FIG. 3 is an enlarged view of the tier sheet dispensing apparatus shown in FIG. 1.

A pair of parallel support surfaces 42 are mounted in the frame 24 for vertical movement together upwardly and downwardly through the interior of the frame. As best seen in FIGS. 1 and 3, the pair of support surfaces 42 face upwardly in the interior of the frame and have convex configurations. The pair of support surfaces 42 are on the top edges of a pair of parallel panels 44 that are part of a hoist mechanism in the apparatus frame 24. The pair of panels 44 are mounted in the frame 24 for movement between lower positions of the panels 44 shown at the bottom of the frame in FIGS. 1 and 3, and upper positions of the panels 44' shown at the top of the frame in FIGS. 1 and 3. The panels 44' in their upper positions are identified by the reference number 44 followed by a prime ('). Each of the panels 44 has a longitudinal length that extends across the interior of the frame 24. The opposite ends of the panels 44 are secured to crossbars 46 that extend laterally across the interior of the frame 24.

As best seen in FIG. 3, the crossbars 46 secure the parallel panels 44 at positions on opposite sides of the rollers 28 and between the pair of belt conveyors 32 at the bottom of the frame. The laterally opposite ends of the crossbars 46 are operatively connected to vertical chain drives 48 at the opposite sides of the frame. The vertical chain drives 48 are operatively connected to a transverse chain drive 52 to selectively move the crossbars 46 between lower positions of the crossbars 46 shown in FIG. 4, and upper positions of the crossbars 46' shown in FIG. 4. The crossbars 46' in their upper positions are identified by the reference number 46 followed by a prime ('). The transverse chain drive 52 is driven by a motor 54. Selective operation of the motor 54 controls the transverse chain drive 52 to drive the vertical chain drives 54 and selectively move the crossbars 46 and the parallel panels 44 upwardly and downwardly between the lowered positions of the panels 44 shown in FIGS. 1, 3, and 4, and the raised positions of the panels 44' shown in FIGS. 1, 3, and 4.

When the parallel panels 44 are in their lowered positions, the top support surfaces 42 of the panels are positioned below the stack of tier sheets 26 supported on the rollers 28 and the belt conveyors 32. As the parallel panels 44 are raised, the support surfaces 42 come into engagement with the bottom of the stack of tier sheets 26 and raise the stack of tier sheets upwardly above the belt conveyors 32 and the rollers 28. As the parallel panels 44 lift the stack of tier sheets from the belt conveyors 32 and the rollers 28, the convex curved configurations of the panel support surfaces 42 bend the stack of tier sheets 26 in a curved configuration. The topmost tier sheet 22 in the stack has a top surface that is bent in a convex configuration due to the curvature of the support surfaces 42 of the parallel panels 44.

The hoist mechanism formed by the vertical chain drives 48, the transverse chain drive 52, and the motor 54 is controlled to raise the parallel panels 44 and the stack of tier sheets 26 relative to the frame 24. Referring to FIGS. 1 and 3, a pair of photo controls 40a, 40b are mounted on the frame 24 toward the top of the frame. The photo control 40a is positioned slightly below and to the left of the photo control 40b as shown in FIGS. 1 and 3. These two photo controls are employed in controlling the lifting movement of the hoist mechanism. When the hoist mechanism is first controlled to lift the stack of tier sheets 26, the sheets are lifted at a first speed through the frame 24 until the light beam emitted by the lower photo control 40a is broken by the top of the stack of sheets 26. This controls the hoist mechanism to slow the lifting speed of the stack of sheets 26. When the light beam of the second, upper photo control 40b is broken, the lifting movement of the stack of sheets 26 is stopped. As will be explained, a lift mechanism of the invention operates to separate and lift individual tier sheets 22 from the top of the stack 26. The lift mechanism is operated to remove a predetermined number of tier sheets from the stack, for example 8 sheets or 12 sheets. When the predetermined number of sheets 22 has been removed from the top of the stack, the control system of the hoist mechanism is again operable to determine if the light beam of the photo sensor 40b is interrupted. If the light beam of photo sensors 40b is interrupted, additional sheets are removed from the stack until 40b is not interrupted. Then the hoist mechanism is operated to lift the stack of tier sheets 26 until the light beam of the upper photo sensor 40b is interrupted. In this manner, after each sequence of the predetermined number of tier sheets have been removed from the top of the stack 26 and the upper photo sensor 40b is not interrupted, the hoist mechanism is controlled to reposition the stack 26 upwardly until the stack interrupts the light beam of the upper photo sensor 40b.

Figure 2:
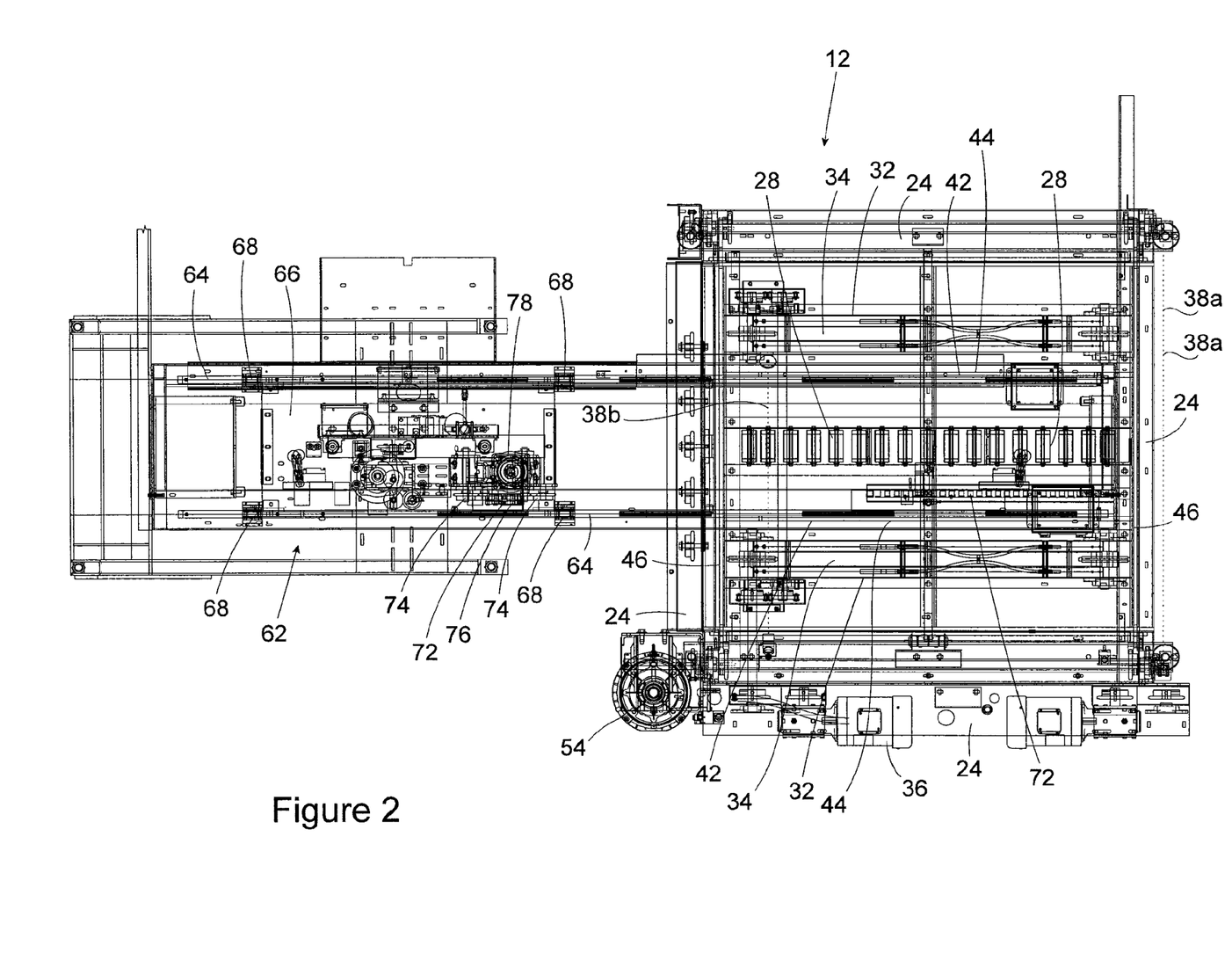
FIG. 2 is a top plan view of the tier sheet dispensing apparatus and a portion of a lift mechanism of the apparatus that extends over the conveyor system.

The apparatus of the invention also comprises a lift mechanism 62 that selectively lifts the topmost tier sheet from the stack 26 supported in the frame 24, and moves the tier sheet transversely from a position over the stack of tier sheets 26 to a position over the layer of objects 18 supported by the conveying surface 16 of the conveyor system 14. The lift mechanism 62 comprises a pair of parallel bars 64 that extend from above the frame 24 to positions above the conveying surface 16 of the conveyor system 14. A base 66 of the lift mechanism is supported on the pair of bars 64 by a plurality of slide bushings 68. The bushings 68 are secured to the lift mechanism base 66, and are mounted on the pair of bars 64 for sliding movement of the bushings along the lengths of the bars. A chain drive mechanism 72 (only a portion of which is shown in FIG. 2) extends along the lengths of the bars 64. The length of a chain 72 of the chain drive mechanism passes around idler sprockets 74 and a drive sprocket 76 that are mounted on the lift mechanism base 66. The drive sprocket 76 is selectively rotated in opposite directions by a motor 78 mounted on the lift mechanism base 66. Operation of the motor 78 moves the lift mechanism base 66 along the pair of bars 64 between a first position of the base 66 directly above the frame 24, and a second position of the base 66 directly above the conveyor system conveying surface 16 as shown in FIG. 1. Thus, the lift mechanism base 66 moves transversely relative to the upward and downward movement of the parallel panel support surfaces 42 of the elevating mechanism.

Figure 6:
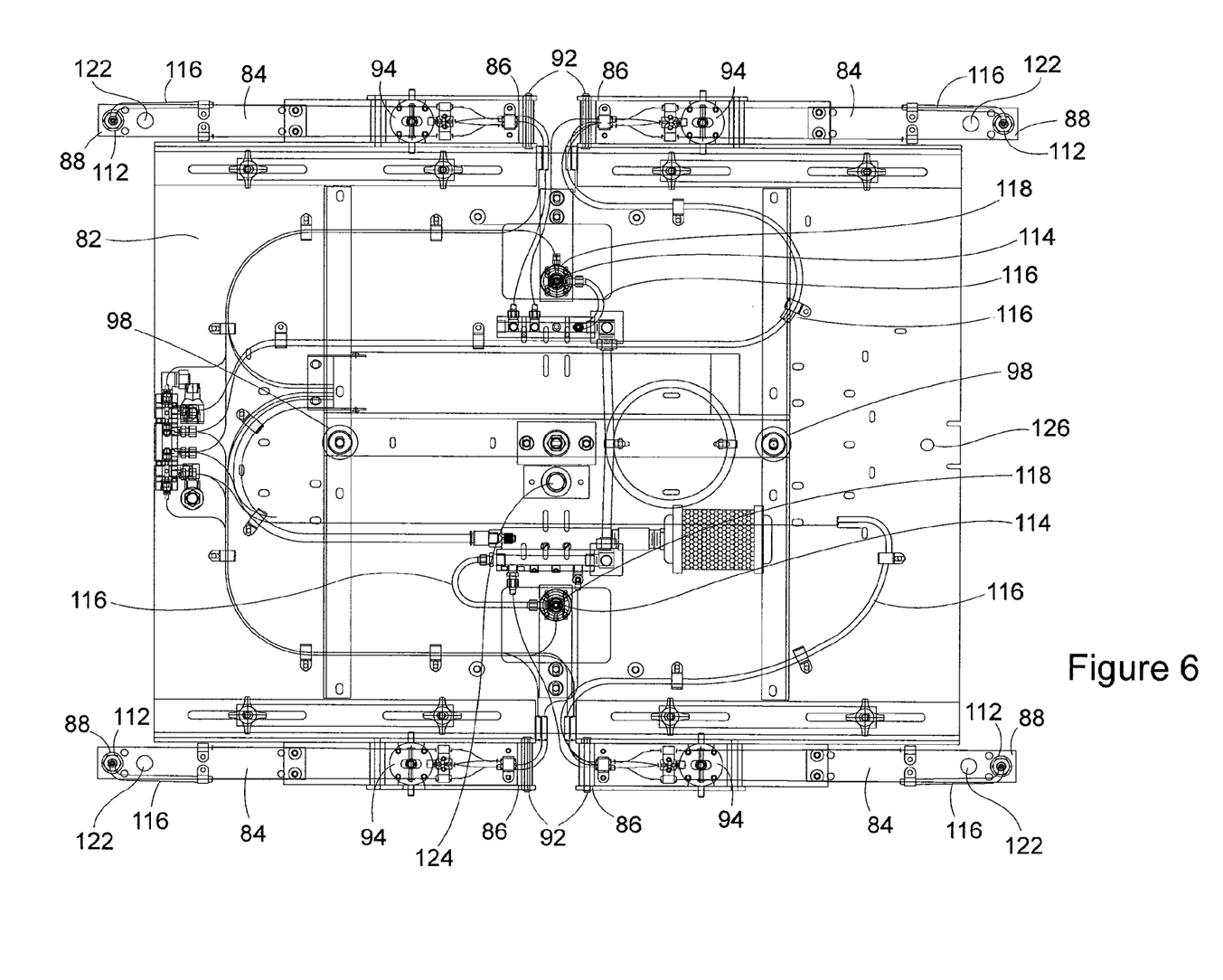
FIG. 6 is a top plan view of portions of the lift mechanism shown in FIG. 5.

The lift mechanism includes an arm support panel 82 that is positioned beneath the lift mechanism base 66. FIG. 6 shows a partial top plan view of the arm support panel 82. Four elongate arms 84 are mounted on the arm support panel. Each of the arms 84 has opposite proximal 86 and distal 88 ends. The arm proximal ends 86 are mounted to the arm support panel 82 by pivot connections 92 that enable the arm distal ends 88 to move upwardly and downwardly relative to the arm support panel. An actuator 94 is mounted between each arm 84 and the arm support panel. Selective operation of the actuators 94 pivots the arms 84 about their pivot connections 92 and moves the arm distal ends 88 between lowered and raised positions relative to the arm support panel 82 and the lift mechanism base 66. Each of the actuators 94 contain a switch, for example a reed switch that signals when the actuator 94 and its connected arm 84 are in the raised positions.

The arm support panel 82 is suspended beneath the lift mechanism base 66 by a pair of vertical rods 98. The rods 98 are mounted to the lift mechanism base 66 by slide bushings 102 that enable the rods 98 to move upwardly and downwardly relative to the base 66. A chain drive 104 is connected between the arm support panel 82 and a sprocket 106 driven by a motor 108 on the lift mechanism base 66. Selective rotation of the sprocket 106 in different directions by the motor 108 causes the chain drive 104 to raise and lower the arm support panel 82 relative to the base 66.

Four suction cups 112 are mounted on the four distal ends 88 of the arms 84. An additional pair of suction cups 114 is mounted at a central area of the arm support panel 82. The positions of the four suction cups 112 at the arm distal ends 88 substantially correspond to the four areas on the top tier sheet of the stack 26 that are adjacent the four corners of the tier sheet 22. The positions of the central suction cups 114 correspond to a middle area of the top tier sheet 22. Each of the arm cups 112 and central cups 114 has a lift surface on the bottom of the cup that surrounds a vacuum opening at the center of the cup lift surface. A series of conduits 116 communicate the cups' vacuum openings with a source of vacuum pressure (not shown) that is selectively supplied to the conduits 116. The source of vacuum pressure is transferred through the conduits 116 to each of the suction cups 112, 114 where the vacuum pressure is supplied to the vacuum openings surrounded by the surfaces of the cups. Downward and upward movement of each of the arm distal ends 88 moves the arm suction cup 112 between a lower position (shown in dashed lines in FIG. 7) and an upper position (shown in solid lines in FIG. 7) relative to the arm support panel 82 and the lift mechanism base 66.

Figure 5:
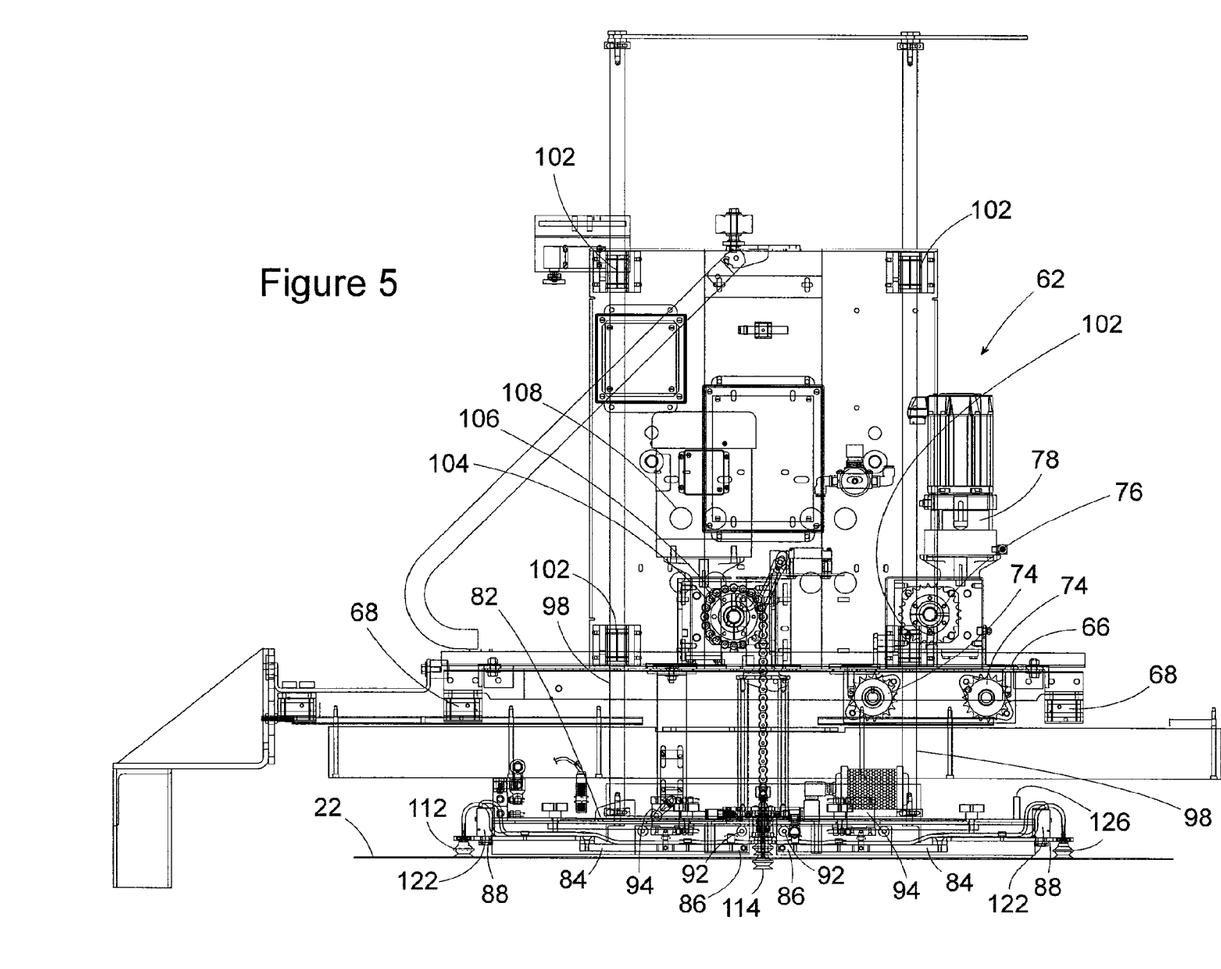
FIG. 5 is an enlarged view of the lift mechanism of the apparatus shown in FIG. 1.
Figure 7:
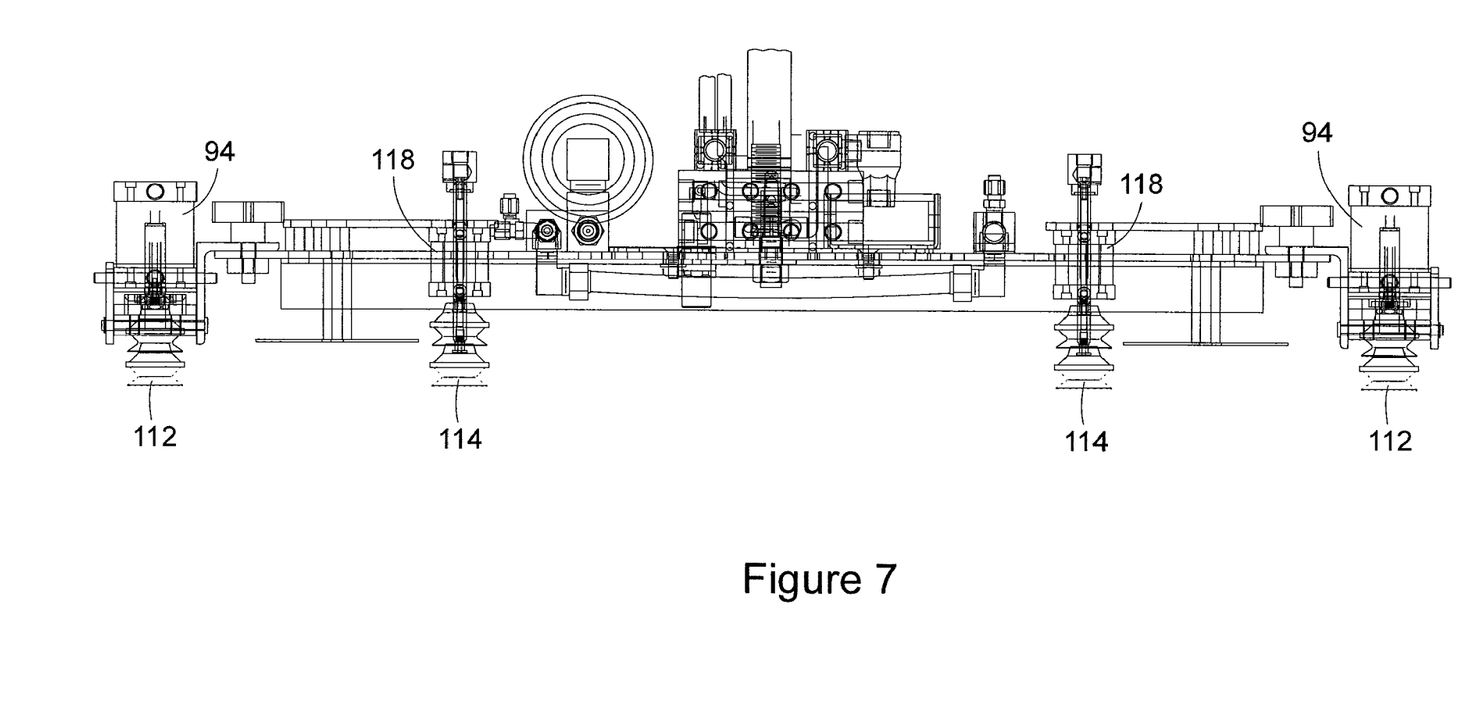
FIG. 7 is an end elevation view of the portion of the lift mechanism shown in FIG. 6 from the left side of the lift mechanism.

Each of the central suction cups 114 is mounted to an actuator 118 that moves the cup upwardly and downwardly relative to the support panel 82. FIGS. 4, 5 and 7 show the central suction cups 114 move to their lower (shown in dashed lines) and upper (shown in solid lines) positions by their actuators 118. In the upper positions of the central cups 114, the central cups 114 are positioned in basically the same horizontal plane as the arm suction cups 112 at the distal ends of the arms 84. However, when the arm actuators 94 move the arms 84 downwardly to position the arms suction cups 112 at their lower positions, the arm suction cups 112 are positioned lower relative to the lift base 66 than the central suction cups 114. This enables the arm suction cups 112 to engage the top surface of a tier sheet at the periphery of the tier sheet that is positioned lower than the central portion of the tier sheet when the stack of tier sheets is bent by the panel support surface 42.

A position sensor 122 is mounted on each of the arms 84 adjacent the suction cup 112 on the arm. The position sensors 122 are operable to sense the presence of a corner area of a tier sheet 22 after the arm 84 has been lowered. This ensures that the suction cup 112 at the end of the arm 84 engages with a corner area of the tier sheet 22. When the position sensors 122 sense that all of their associated suction cups 112 are lowered and positioned against a corner area of the top tier sheet 22, the control system of the hoist mechanism supplies vacuum to each of the suction cups 112.

An additional position sensor 124 is provided on the lift mechanism in the central area of the lift mechanism arm support panel 82. This position sensor 124 senses when the arm support panel 82 has been lowered to a desired distance above the center area of the topmost tier sheet in the stack of tier sheets 26.

A plunger assembly 126 is also mounted to the arm support panel 82. The plunger assembly 126 is pneumatically operated when the lifting of a tier sheet 22 from the top of the stack 26 is aborted by the lift mechanism 62, as explained below.

In operation of the apparatus, a stack of tier sheets 26 is first loaded into the apparatus frame 24. The stack of tier sheets 26 is loaded into the frame 24 by a separate supply conveyor (not shown), or by other equivalent means. The stack of tier sheets 26 is initially supported in the frame 24 by the belt conveyor surfaces 34 and the plurality of rollers 28 at the bottom of the frame 24. Each of the tier sheets in the stack 26 is initially in a flat, horizontal configuration.

As explained earlier, the hoist mechanism is operable to lift the stack of tier sheets 26 until the topmost tier sheet in the stack is positioned just above the top photo sensor 40b. The convexly curved support surfaces 42 engage against the underside of the stack of tier sheets 26 as they lift the stack of sheets above the belt conveyor surfaces 34 and the rollers 28. The convex curved support surfaces 42 bend the stack of tier sheets so that the topmost tier sheet 22 has a top surface that is bent in a convex configuration. This causes the edges of the tier sheets in this stack 26 to separate slightly from each other, which assists in separating a top tier sheet from the stack of tier sheets. The separation of the tier sheet edges at the opposite ends of the convex curvatures of the tier sheets allows air to enter between the tier sheets as the topmost tier sheet is peeled away from the stack of tier sheets 26 by the lift mechanism 62 of the invention.

In operation of the lift mechanism 62, the lift mechanism is lowered toward the stack of tier sheets 26 until the central position sensor 124 senses that the lift mechanism is at a desired position just above the central crown area of the top tier sheet 22 in the stack of tier sheets 26. The actuators 94 of the arms are then operated to cause the arms 84 to lower toward the top tier sheet 22. The proximity sensors 122 at the end of the arms sense when the ends of the arms are downwardly adjacent the corner areas of the top tier sheet 22 and the suction cups 112 of the arms are positioned against the corner areas of the tier sheet 22. At this point, vacuum pressure is supplied to each of the suction cups 112 causing each suction cup to be attached to a corner area of the tier sheet. Following a desired time period to allow the vacuum level to rise, the actuator arms 84 are then controlled to be moved to their raised positions. This causes the suction cups 112 to gradually peel the corner areas of the topmost tier sheet 22 away from the stack of tier sheets 26. This peeling motion and the convex curvature of the topmost tier sheet allows air to enter between the edges of the topmost tier sheet and the next tier sheet in the stack 26. This allows the topmost tier sheet 22 to be separated from the stack of tier sheets 26 while reducing pulling on the next tier sheet in the stack. As the arms 84 are raised and all the arm actuator 94 sensors determine that the arms are in their fully raised positions, the central suction cups 114 are quickly lowered to engage the middle area of the topmost tier sheet 22 and then raised up. Vacuum applied to the central suction cups 114 secures the central area of the tier sheet 22 to these suction cups. The central sensor 124 senses that the middle area of the sheet 22 has been raised. The arm support panel 82 is then raised relative to the lift mechanism base 66.

If any of the position sensors 122 determine that if one or more corner area of the top tier sheet 22 is not held to the associated suction cup 112, then the lifting operation of the tier sheet 22 is quickly aborted prior to the upward movement of the arm support panel 82. The vacuum supplied to each of the suction cups 112,114 is stopped, and the plunger 126 is deployed. This causes the tier sheet 22 to be released from the lifting mechanism to fall back toward the stack of tier sheets. To ensure that the released tier sheet 22 does not float or glide to one side or toward the entrance of the frame, relative to the stack of tier sheets 26 as it falls back to the top of the stack of tier sheets 26, the plunger 126 is quickly deployed. The deployment of the plunger 126 quickly pushes the released tier sheet 22 back onto the stack of tier sheets 26 and prevents any significant floating (gliding) movement of the released tier sheet 22 to any one side nor toward the entrance of the frame. This ensures that the released tier sheet 22 will fall to substantially the same position the tier sheet previously occupied at the top of the stack 26.

When a tier sheet 22 has been separated from the top of the stack 26 and lifted above the stack by a lift mechanism 62, the lift mechanism base 66 is then moved transversely relative to the conveyor system 14. The lift mechanism base 66 is moved to a position over the conveyor system 14 and over the layer of objects 18 supported on the conveyor system 16. The arm support panel 82 is then lowered so that the tier sheet 22 held by the lift mechanism is positioned slightly above the layer of objects 18 on the conveying surface 16. In the preferred embodiment, the tier sheet 22 is positioned about one-quarter of an inch above the layer of objects 18. The vacuum supplied to the suction cups 112,114 is then stopped. This releases the tier sheet 22 from the suction cups 112,114, and positions the tier sheet 22 on the top of the layer of objects 18 supported on the conveying surface 16. With the tier sheet 22 deposited on the layer of objects 18, the layer of objects is prepared for being conveyed further down the conveyor system 14. This allows the next two-dimensionally arrayed layer of objects to move to a position adjacent the tier sheet dispensing apparatus 12 where the apparatus is again operated to lift a tier sheet from the stack of tier sheets and deposit the tier sheet on the top of a sequential layer of objects.

As explained earlier, the convex curved support surfaces 42 bend the stack of tier sheets so that the tier sheet dispensed by the apparatus has been bent in a convex configuration by the stack 26. When this tier sheet is deposited onto a layer of objects 18 conveyed on the conveyor system 14, the center portion of the tier sheet rests flat against the top surfaces of the layered objects. However, as a result of the top sheet having been bent in a convex configuration by having been supported on the convex curved support surfaces 42, when the tier sheet is positioned on the layer of the objects, the configuration of the tier sheet tends to reverse. The top surface of the sheet that was once bent in a downward configuration now has edges that angle slightly upwardly. This results in the edges of the tier sheet and the corners of the tier sheet being generally angled slightly upwardly relative to the center top surface of the tier sheet. When a subsequent layer of objects is positioned on the tier sheet top surface, the upwardly angled orientations of the tier sheet edges and tier sheet corners assist in holding the objects around the perimeter of the subsequent layer of objects on the tier sheet and help prevent these objects from falling from the tier sheet.

Although the apparatus of the invention has been described above by reference to a specific embodiment of the apparatus, it should be understood that modifications and variations could be made to the apparatus without departing from the intended scope of the following claims.

What is claimed is:

1. A tier sheet dispensing apparatus positioned adjacent to and extending over a conveying system that separates an individual tier sheet from a top of a stack of tier sheets, lifts the tier sheet vertically from the stack and moves the tier sheet transversely from the stack to a position over a two-dimensionally arrayed layer of objects conveyed by the conveying system to dispense the tier sheet from the apparatus and place the tier sheet on the layer of objects, the apparatus comprising:

a frame constructed of a plurality of metal bars assembled together in a box configuration;

a conveyor at a bottom of the frame, the conveyor having a top conveying surface that is positioned to support a stack of substantially flat tier sheets, the conveyor being operable to move the stack of tier sheets supported on the conveying surface into the frame with each of the tier sheets in the stack of tier sheets being substantially flat when supported on the conveying surface and fully inserted into the frame;

an upwardly facing convex support surface mounted in the frame for vertical movement upwardly and downwardly through the frame between a lower position of the convex support surface and an upper position of the convex support surface where in the lower position the convex support surface is positioned below the conveying surface and below the stack of tier sheets supported on the conveying surface and as the convex support surface moves upwardly the convex support surface comes into engagement with a bottom of the stack of tier sheets and raises the stack of tier sheets upwardly above the conveying surface and as the convex support surface lifts the stack of tier sheets from the conveying surface the convex support surface bends the stack of tier sheets in a curved configuration with a topmost tier sheet in the stack of tier sheets having a top surface that is bent in a convex configuration due to the convex support surface; and, a lift mechanism above the frame, the lift mechanism having a lift surface positioned above the convex support surface to engage with the topmost tier sheet in the stack of tier sheets, the lift mechanism being operable to lift the topmost tier sheet in an upward direction from the stack of tier sheets supported in the frame and separate the topmost tier sheet from the stack of tier sheets and then move the tier sheet transversely from a first position over the stack of tier sheets supported in the frame to a second position over the layer of objects conveyed by the conveying system.

2. The apparatus of claim 1, further comprising:
the convex support surface being on a top edge of a panel.

3. The apparatus of claim 2, further comprising:
the panel having a longitude length that extends across the frame.

4. The apparatus of claim 1, further comprising:
a hoist mechanism mounted on the frame that is operatively connected to the convex support surface and is operable to selectively move the convex support surface in opposite upward and downward directions between top and bottom positions of the convex support surface relative to the apparatus.

5. The apparatus of claim 1, further comprising:
the conveyor at the bottom of the frame being a belt conveyor.

6. The apparatus of claim 1, further comprising:
the convex support service being one of two parallel convex support surfaces mounted in the frame for vertical movement together upwardly and downwardly through the frame.

7. The apparatus of claim 1, further comprising:
the convex support surface being one of two parallel convex support surfaces mounted in the frame for vertical movement together upwardly and downwardly through the frame, the convex support surfaces being on top edges of a pair of panels.

8. The apparatus of claim 1, further comprising:
the convex support surface being one of a pair of separate convex support surfaces that are positioned on opposite sides of the conveying surface is the frame interior.

9. A tier sheet dispensing apparatus positioned adjacent to and extending over a conveying system that separates an individual tier sheet from a top of stack of tier sheets, lifts the tier sheet vertically from the stack and moves the tier sheet transversely from the stack to a position over a two dimensionally arrayed layer of objects conveyed by the conveying system to dispense the tier sheet from the apparatus and place the tier sheet on the layer of objects, the apparatus comprising:

a frame constructed of a plurality of metal bars assembled together in a box configuration, the frame being dimensioned to receive a stack of tier sheets in an interior of the frame, the front of the frame being open to receive a stack of tier sheets in the frame interior and a top of a frame being open to allow for passage of a single tier sheet from the frame interior;

a conveyor extending through the frame front opening and into the frame interior at a bottom of the frame, the conveyor having a top conveying surface that is positioned to support a stack of substantially flat tier sheets, the conveyor being operable to move the stack of tier sheets supported on the conveying surface through the frame front opening and into the frame interior with each of the tier sheets in the stack of tier sheets being substantially flat when supported on the conveying surface and fully inserted into the frame;

an upwardly facing convex support surface mounted in the frame for vertical movement upwardly and downwardly through the interior of the frame between a lower position of the convex support surface and an upper position of the convex support service where in the lower position the convex support surface is positioned below the convoying surface and below the stack of tier sheets supported on the conveying surface and as the convex support surface moves upwardly the convex support surface comes into engagement with a bottom of the stack of tier sheets supported on the conveying surface and raises the stack of tier sheets upwardly above the conveying surface and as the convex support surface lifts the stack of tier sheets from the conveying surface the convex support surface bends the stack of tier sheets in a curved configuration with a topmost tier sheet in the stack of tier sheets having a top surface that is bent in a convex configuration due to the convex support surface;

a lift mechanism above the frame, the lift mechanism having a lilt surface positioned above the convex support surface to engage with the top most tier sheet in the stack of tier sheets bent by the convex support surface, the lift mechanism being operable to lift the top most tier sheet in an upward direction from the stack of tier sheets bent by the convex support surface and separate the top most tier sheet from the stack of tier sheets bent by the convex support surface, lift the tier sheet through the frame top opening and move the tier sheet transversely from a first position over the stack of tier sheets bent by the convex support surface to a second position over the layer of objects conveyed by the conveying system.

10. The apparatus of claim 9, further comprising:
the convex support surface being on a top edge of a panel.

11. The apparatus of claim 10, further comprising:
the panel having a length that extends across the interior of the frame.

12. The apparatus of claim 9, further comprising:
a hoist mechanism mounted on the frame that is operatively connected to the convex support surface and is operable to selectively move the convex support surface in opposite upward and downward directions through the interior of the frame between top and bottom positions of the support surface relative to the apparatus.

13. The apparatus of claim 9, further comprising:
the conveyor at the bottom of the frame being a belt conveyor.

14. The apparatus of claim 9, further comprising:
the convex support surface being one of two parallel convex support surfaces mounted in the frame for vertical movement together upwardly and downwardly through the frame interior.

15. The apparatus of claim 9, further comprising:
the convex support surface being one of two parallel convex support surfaces mounted in the interior of the frame for vertical movement together upwardly and downwardly through the frame interior, the two parallel convex support surfaces being on top edges of a pair of panels.

16. The apparatus of claim 9, further comprising:
the convex support surface being one of a pair of separate convex support surfaces that are positioned on opposite sides of the conveying surface in the frame interior.

17. A tier sheet dispensing apparatus positioned adjacent to and extending over a conveying system that separates an individual tier sheet from a top of a stack of tier sheets, lifts the tier sheet vertically from the stack and moves the tier sheet transversely from the stack to a position over a two dimensionally arrayed layer of objects conveyed by the conveying system to dispense the tier sheet from the apparatus and place the tier sheet on the layer of objects, the apparatus comprising:
a frame constructed of a plurality of metal bars assembled together in a box configuration, the frame being dimensioned to receive a stack of tier sheets in an interior of the frame;
a conveyor at a bottom of the frame, the conveyor having a top conveying surface that is positioned to support a stack of substantially flat tier sheets, the conveyor being operable to move the stack of tier sheets supported on the conveying surface into the frame interior with each of the tier sheets in the stack of tier sheets being substantially flat when supported on the conveying surface and fully inserted into the frame;
an upwardly facing convex support surface mounted in the frame for vertical movement upwardly and downwardly through the interior of the frame between a lower position of the convex support surface and an upward position of the convex support surface where in the lower position the convex support surface is positioned below the conveying surface and below the stack of tier sheets supported on the conveying surface and as the convex support surface moves upwardly the convex support surface engages with a bottom of the stack of tier sheets supported on the conveying surface, raises the stack of tier sheets upwardly above the conveying surface and as the convex support surface lifts the stack of tier sheets from the conveying surface the convex support surface bends the stack of tier sheets in a curved configuration with a top most tier sheet in the stack of tier sheets having a top surface that is bent in a convex configuration due to the convex support surface;
a lift mechanism above the frame, the lift mechanism having a lift surface positioned above the convex support surface to engage with the topmost tier sheet in the stack of tier sheets, the lift mechanism being operable to lift the topmost tier sheet in an upward direction from the stack of tier sheets bent in a convex configuration due to the convex support surface and separate the topmost tier sheet from the stack of tier sheets bent in the convex configuration, and move the tier sheet transversely from a first position over the stack of tier sheets bent in the convex configuration due to the convex support surface to a second position over the layer of objects conveyed by the conveying system;
the lift mechanism lift surface being one of a plurality of lift surfaces with each lift surface having a vacuum opening, the plurality of lift surfaces including a central lift surface and several peripheral lift surfaces that are arranged around the central lift surface; and
the peripheral lift surfaces being movable in the upward and downward directions relative to the central lift surface between respective upper and lower positions of the peripheral lift surfaces wherein the upper positions the peripheral lift surfaces are in basically a same horizontal plane as the central lift surface and in the lower positions the peripheral lift surfaces are positioned lower than the central lift surface.

18. The apparatus of claim 17, further comprising:
the convex support surface being on a top edge of a panel.

19. The apparatus of claim 18, further comprising:
the panel having a length that extends across the interior of the frame.

20. The apparatus of claim 17, further comprising:
the conveyor at the bottom of the frame being a belt conveyor.

21. The apparatus of claim 17, further comprising:
the convex support surface being one of two parallel convex support surfaces mounted in the frame for vertical movement together upwardly and downwardly through the frame interior.

22. The apparatus of claim 17, further comprising:
the convex support surface being one of two parallel convex support surfaces mounted in the frame for vertical movement together upwardly and downwardly through the frame interior, the two parallel convex support surfaces being on top edges of two panels.

23. The apparatus of claim 17, further comprising;
the convex support surface being one of a pair of separate convex support surfaces that are positioned on opposite sides of the conveying surface in the interior of the frame.

24. A tier sheet dispensing apparatus positioned adjacent to and extending over a conveying system that separates an individual tier sheet from a top of a stack of tier sheets, lifts the tier sheet vertically from the stack and moves the tier sheet transversely from the stack to a position over a two dimensionally arrayed layer of objects conveyed by the conveying system to dispense the tier sheet from the apparatus and place the tier sheet on the layer of objects, the apparatus comprising:
a frame constructed of a plurality of metal bars assembled together in a box configuration, the frame being dimensioned to receive a stack of tier sheets in an interior of the frame;
a conveyor at a bottom of the frame, the conveyor having a top conveying surface that is positioned to support a stack of substantially flat tier sheets, the conveyor being operable to move the stack of tier sheets supported on the conveying surface into the frame interior with each of the tier sheets in the stack of tier sheets supported on the conveying surface being substantially flat when fully inserted into the frame;
an upwardly facing convex support surface mounted in the frame for vertical movement upwardly and downwardly through the interior of the frame between a lower position of the convex support surface and an upper position of the convex support surface where in the lower position the convex support surface is positioned below the stack of tier sheets supported on the conveying surface and as the convex support surface moves upwardly engagement of the convex support surface with a bottom of the stack of tier sheets supported on the conveying surface raises the stack of tier sheets upwardly above the conveying surface and as the convex support surface lifts the stack of tier sheets above the conveying surface the convex support surface bends the stack of tier sheets into a curved configuration with a topmost tier sheet in the stack of tier sheets having a top surface that is bent in a convex configuration due to the convex support surface;

a lift mechanism above the frame and above the convex support surface to engage with the top tier sheet of the stack of tier sheets bent in the convex configuration due to the convex support surface, the lift mechanism being operable to lift the top tier sheet in the upward direction and separate the top tier sheet from the stack of tier sheets supported on the conveying surface and move the top tier sheet transversely from a first position over the stack of tier sheets bent in the convex configuration due to the convex support surface to a second position over the layer of objects conveyed by the conveying system;

the lift mechanism having a plurality of lift surfaces that are positioned to engage with the top tier sheet surface when the convex support surface is in the upper position and the stack of tier sheets are bent in a curved configuration due to the convex support surface, each of the plurality of lift surfaces having a vacuum opening in the lift surface that is supplied with a vacuum pressure that holds the top tier sheet in engagement with the plurality of lift surfaces;

the plurality of lift surfaces being movable in the upward direction to separate the top tier sheet held in engagement with the plurality of lift surfaces from the stack of tier sheets bent in the bent configuration due to the convex support surface, the plurality of vacuum openings including a central vacuum opening and several peripheral vacuum openings arranged around the central vacuum opening; and the peripheral vacuum openings each being positioned adjacent to a corner of the top tier sheet and the central vacuum opening being positioned adjacent a center of the top tier sheet when each lift surface engages with the top tier sheet, the peripheral vacuum openings being movable in upward and downward directions between respective tipper and lower positions of the peripheral vacuum openings relative to the central vacuum opening where in the upper positions the peripheral vacuum openings are in basically a same horizontal plane as the central vacuum opening and in the lower positions the peripheral vacuum openings are positioned lower than the central vacuum opening.

\* \* \* \* \*